United States Patent
Yang et al.

(10) Patent No.: US 11,752,800 B2
(45) Date of Patent: Sep. 12, 2023

(54) NON-PNEUMATIC TIRE

(71) Applicant: KENDA RUBBER IND. CO., LTD., Yuanlin Township (TW)

(72) Inventors: Chi-Jen Yang, Yuanlin Township (TW); Min-Fan Huang, Yuanlin Township (TW); Jia-Yi Jiang, Yuanlin Township (TW)

(73) Assignee: KENDA RUBBER IND. CO., LTD., Changhua County (TW)

( * ) Notice: Subject to any disclaimer, the term of this patent is extended or adjusted under 35 U.S.C. 154(b) by 528 days.

(21) Appl. No.: 16/998,840

(22) Filed: Aug. 20, 2020

(65) Prior Publication Data

US 2021/0129587 A1    May 6, 2021

(30) Foreign Application Priority Data

Oct. 31, 2019  (TW) .................................. 108139401

(51) Int. Cl.
*B60C 7/14*        (2006.01)

(52) U.S. Cl.
CPC ................ *B60C 7/146* (2021.08); *B60C 7/14* (2013.01)

(58) Field of Classification Search
CPC  B60C 7/14; B60C 7/143; B60C 7/146; B60C 7/18; B60C 7/102
See application file for complete search history.

(56) References Cited

U.S. PATENT DOCUMENTS

2019/0111645 A1    4/2019   Thompson

FOREIGN PATENT DOCUMENTS

| CN | 204472454 U | * | 7/2015 | |
|----|-------------|---|--------|---|
| CN | 204472454 U |   | 7/2015 | |
| CN | 106541785 A | * | 3/2017 | ............... B60C 7/00 |
| EP | 2679406 B1  |   | 4/2015 | |
| JP | 3923073 B1  | * | 5/2007 | ............... B60C 7/12 |

(Continued)

OTHER PUBLICATIONS

Examination report for TW108139401, dated Jun. 23, 2020, Total of 8 pages.

(Continued)

*Primary Examiner* — Kip T Kotter

(74) *Attorney, Agent, or Firm* — Apex Juris, pllc; Hilde Coeckx

(57) ABSTRACT

A non-pneumatic tire includes a tread layer and a spoke layer including an inner cylinder and several spoke assemblies. The tread layer is annular and has a maximum outer diameter of the non-pneumatic tire and is adapted to be in contact with a ground. The spoke assemblies extend in a radial direction of the non-pneumatic tire and are arranged around an axial core of the non-pneumatic tire. An end of each spoke assembly is connected to the inner cylinder, and another end thereof is connected to the tread layer. Each spoke assembly includes a straight spoke, a bending spoke, and a connecting rib. Each bending spoke includes a first segment and a second segment, which are not connected in a straight line. Each connecting rib has a first end connected to the straight spoke and a second end opposite to the first end and connected to the bending spoke. When the non-pneumatic tire bears a weight and is squeezed, the spoke assemblies do not get in contact with one another.

12 Claims, 6 Drawing Sheets

(56) References Cited

FOREIGN PATENT DOCUMENTS

JP       2007137207 A    6/2007
JP       2013079037 A    5/2013

OTHER PUBLICATIONS

Search report for TW108139401, dated Jun. 18, 2020, Total of 1 page.
English abstract for CN204472454, Total of 1 page.
English abstract for EP2679406, Total of 1 page.
English abstract for JP2007137207, Total of 1 page.
English abstract for JP2013079037, Total of 1 page.

* cited by examiner

NON-PNEUMATIC TIRE

BACKGROUND OF THE INVENTION

Technical Field

The present invention relates generally to a tire, and more particularly to a non-pneumatic tire.

Description of Related Art

For a long time, ordinary vehicles (e.g. automobiles, motorcycles, bicycles) used to use pneumatic tires as the main components of vehicle movement. However, when the pneumatic tires are excessively worn or punctured by sharp objects, the pneumatic tires pop and deflate, so that the vehicle is unable to run, even causing the vehicle to lose control and overturn, resulting in injuries and deaths to drivers and passengers.

Therefore, a non-pneumatic tire has been developed to replace traditional pneumatic tires, thereby completely overcoming the problem of a flat tire and air leakage of traditional tires. A conventional non-pneumatic tire 1 is illustrated in FIG. 1 and includes a tread layer 12 and a spoke layer, wherein the tread layer 12 is adapted to get in contact with a ground G. The spoke layer includes an inner cylinder 14 and a plurality of spoke assemblies 10, wherein the spoke assemblies 10 extend in a radial direction of the conventional non-pneumatic tire 1 and are arranged around an axial core of the conventional non-pneumatic tire 1. An end of each of the spoke assemblies 10 is connected to the inner cylinder 14, and another end thereof is connected to the tread layer 12. As shown in FIG. 1, each of the spoke assemblies 10 is a H-shaped structure and includes two radial spokes 102, 106 and a connecting spoke 104, wherein two ends of the connecting spoke 104 are respectively connected to the two radial spokes 102, 106 to form the H-shaped structure.

Referring to FIG. 2 which is an enlarged partial view of a marked region A in FIG. 1, a part of the spoke assemblies 10 are squeezed and bent when the conventional non-pneumatic tire 1 bears a weight and is squeezed, and the spoke assemblies 10, which are squeezed and bent, get in contact with and rub against the adjacent spoke assemblies 10. For example, when the conventional non-pneumatic tire 1 is disposed on a vehicle and is driven to rotate at high speed, the spoke assemblies 10, which are squeezed and bent, will frequently and severely get in contact with and rub against the adjacent spoke assemblies 10, and may even cause a material of the spoke assemblies 10, which are bent and squeezed, to rapidly age and break due to friction and heat generated by friction, so that the conventional non-pneumatic tire 1 has poor durability and insufficient safety. More specifically, the adjacent spoke assembly 10' has two radial spokes 102', 106', wherein the radial spokes 102', 106' of the adjacent spoke assembly 10' and the radial spokes 102, 106 of the spoke assembly 10, which are squeezed and bent, bend to get in contact with and rub against each other when the conventional non-pneumatic tire 1 bears a weight and is squeezed, causing the radial spoke 106' of the adjacent spoke assembly 10' and the radial spoke 102 of the spoke assembly 10, which is squeezed and bent, are prone to rapidly age and fracture due to friction and heat generated by friction.

In summary, the durability and safety of the conventional non-pneumatic tires still have room to improve such problems existing in the conventional non-pneumatic tires.

BRIEF SUMMARY OF THE INVENTION

In view of the above, the primary objective of the present invention is to provide a non-pneumatic tire, wherein a plurality of spoke assemblies of a spoke layer of the non-pneumatic tire includes a bending spoke, so that when the non-pneumatic tire is squeezed under a weight, the spoke assemblies do not get in contact with one another, preventing frequent and severe friction between the spoke assemblies which are squeezed and bent, enhancing a durability and a safety of the non-pneumatic tire of the present invention.

The present invention provides a non-pneumatic tire including a tread layer and a spoke layer. The tread layer is annular and has a maximum outer diameter of the non-pneumatic tire and is adapted to be in contact with a ground. The spoke layer includes an inner cylinder and a plurality of spoke assemblies, wherein the spoke assemblies extend in a radial direction of the non-pneumatic tire and are arranged around an axial core of the non-pneumatic tire. An end of each of the spoke assemblies is connected to the inner cylinder, and another end of each of the spoke assemblies is connected to the tread layer, wherein each of the spoke assemblies includes a straight spoke, a bending spoke, and a connecting rib. The bending spoke includes a first segment and a second segment, wherein the first segment and the second segment are not connected in a straight line. The connecting rib has a first end and a second end opposite to the first end, wherein the first end is connected to the straight spoke, and the second end is connected to the bending spoke. When the non-pneumatic tire bears a weight and is squeezed, the spoke assemblies do not get in contact with one another.

With the aforementioned design, since the spoke assemblies of the spoke layer of the non-pneumatic tire according to the embodiment of the present invention includes the bending spoke, the spoke assemblies do not get in contact with one another when the non-pneumatic tire is squeezed under a weight, thereby preventing frequent and severe friction between the spoke assemblies which are squeezed and bent, enhancing a durability and a safety of the non-pneumatic tire of the present invention. In addition, the bending spoke of the spoke assemblies of the spoke layer could make the bending spokes bend in the same direction when the spoke layer is squeezed, thereby reducing a contact probability between the spoke assemblies, which are squeezed and bent, and the adjacent spoke assemblies, improving the durability and a rigidity of the non-pneumatic tire.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
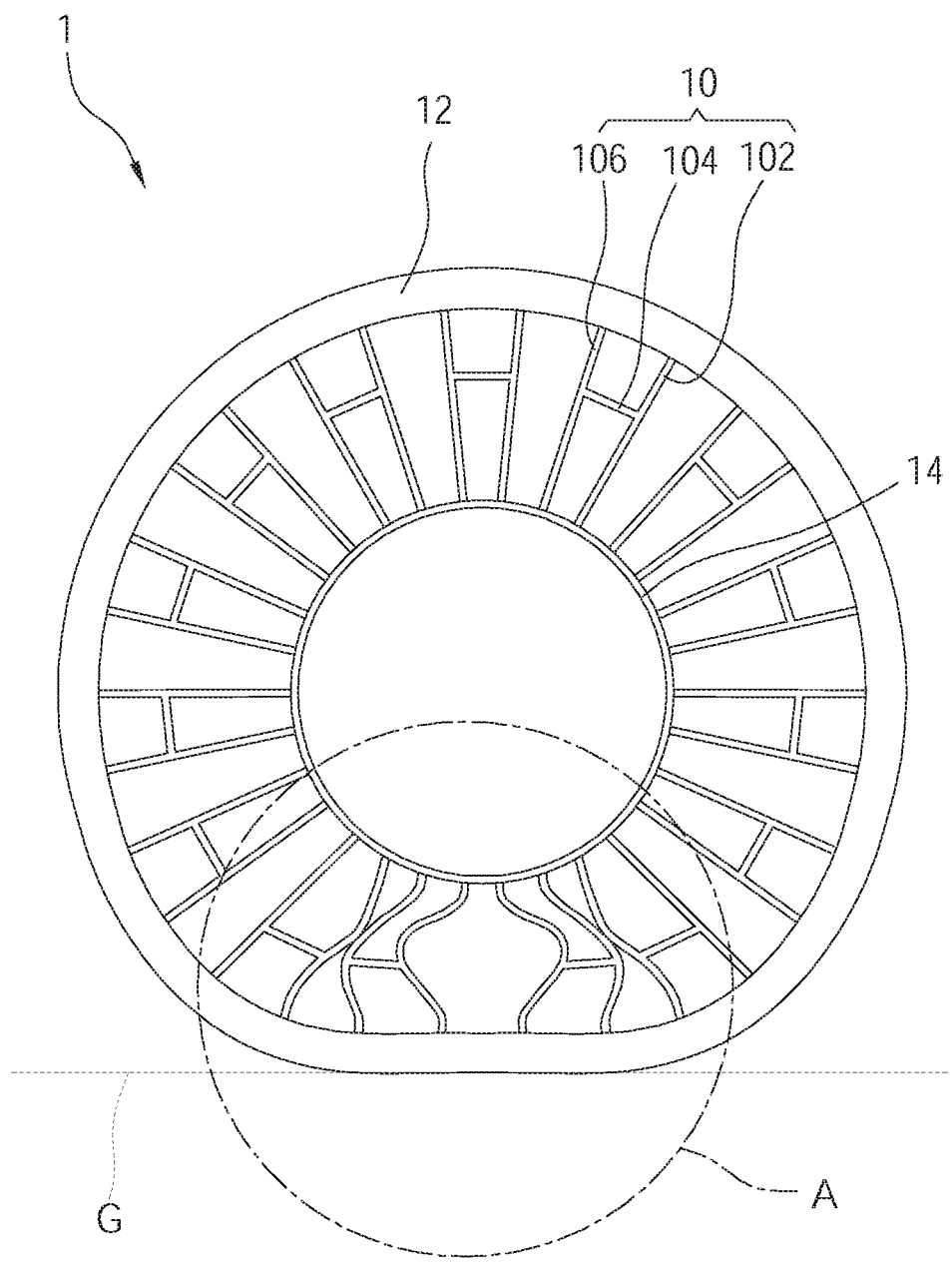
FIG. 1 is a side view of the conventional non-pneumatic tire showing the bottom of the conventional non-pneumatic tire is squeezed under the weight.
Figure 2:
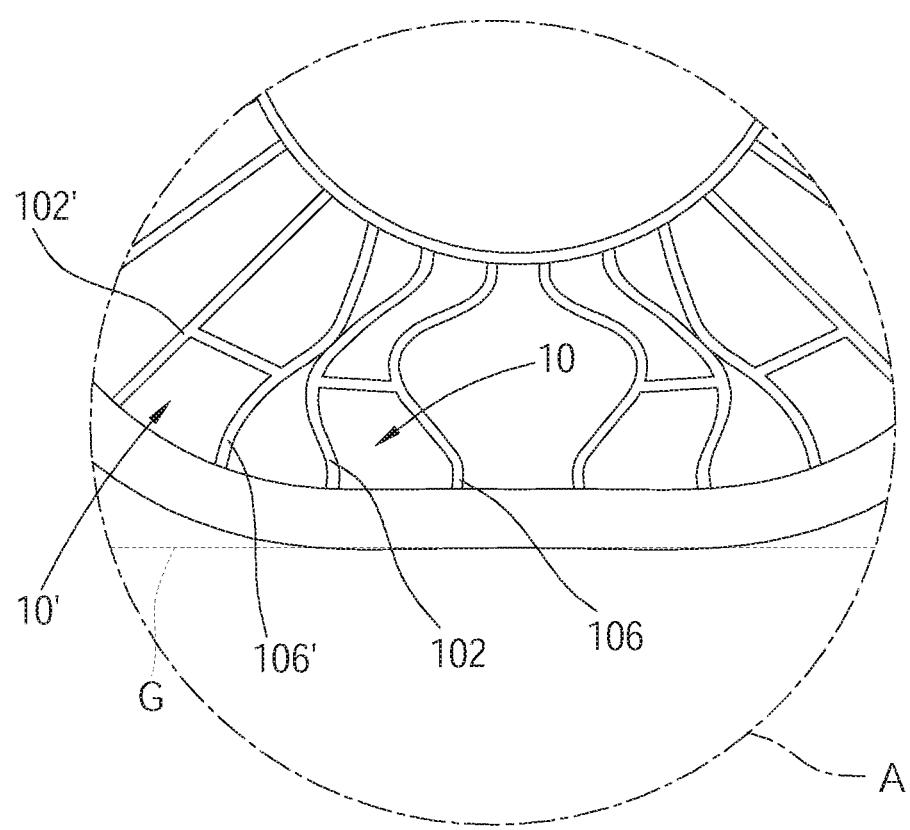
FIG. 2 is an enlarged partial view of a marked region A in FIG. 1.
Figure 3:
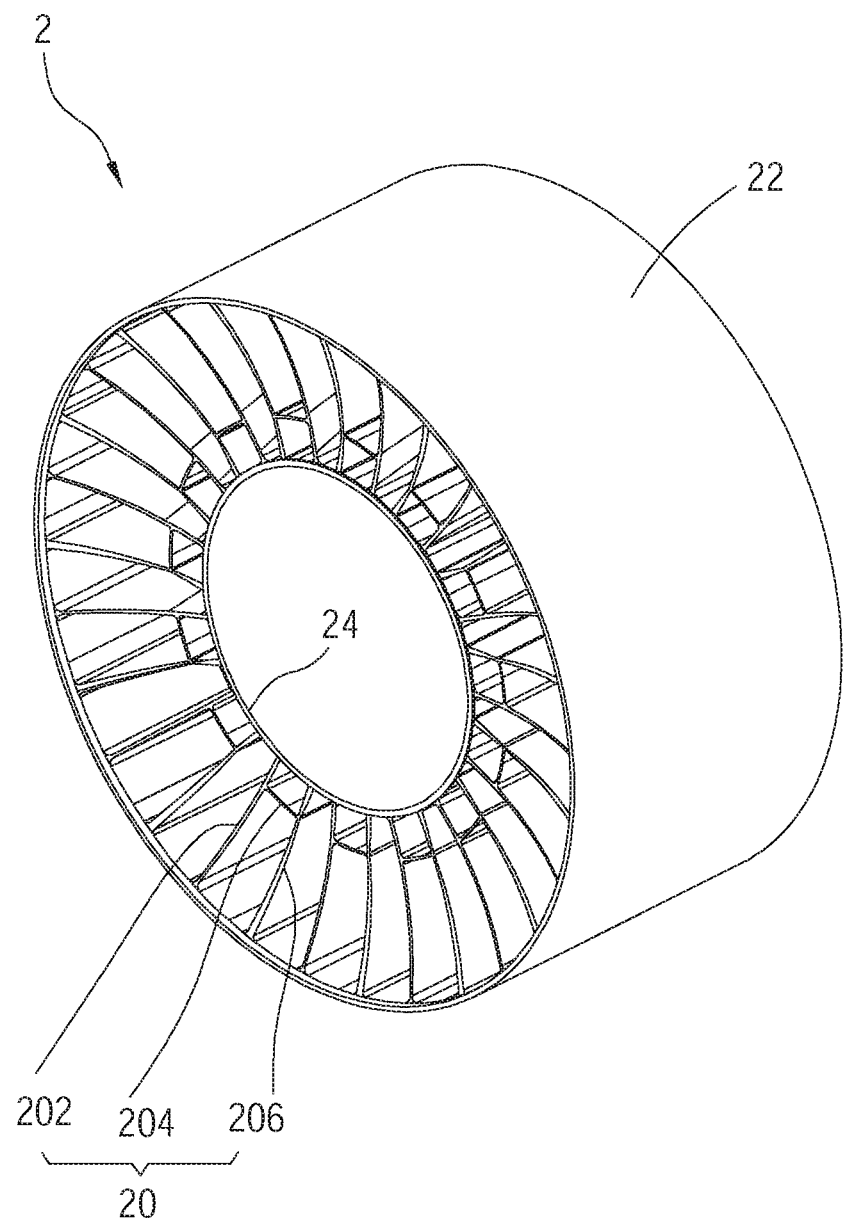
FIG. 3 is a perspective view of the non-pneumatic tire according to an embodiment of the present invention.
Figure 4:
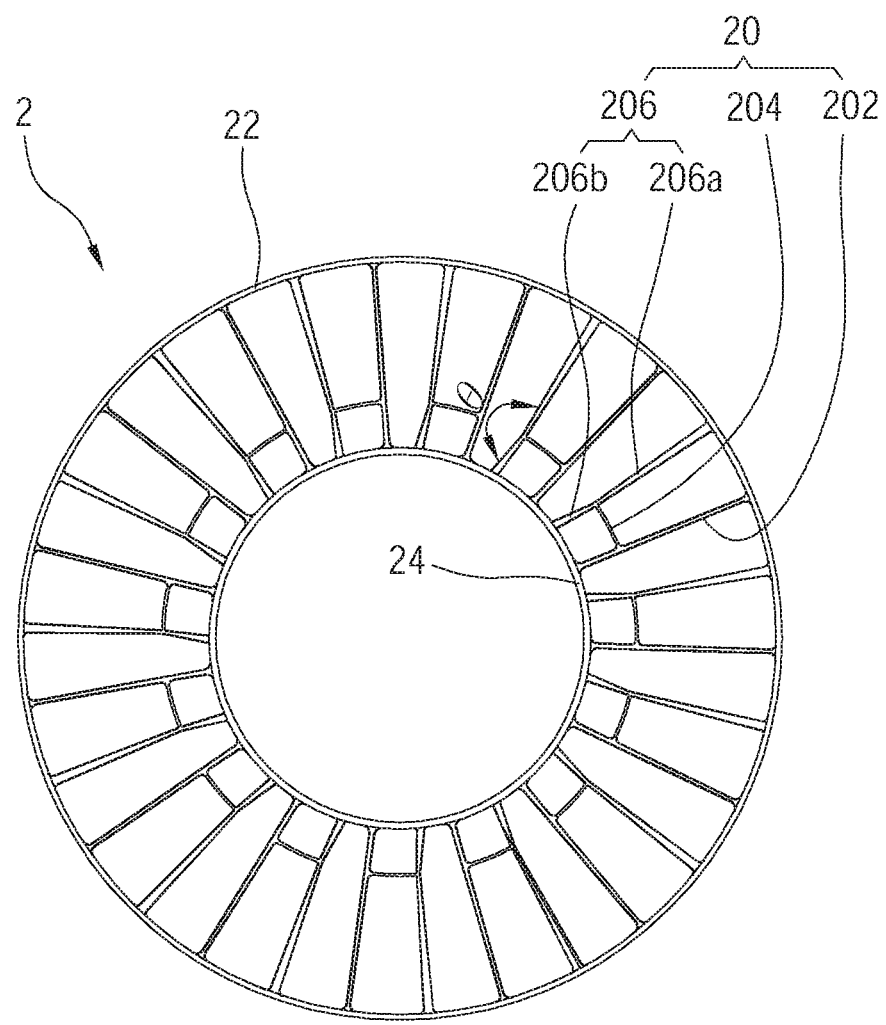
FIG. 4 is a side view of the non-pneumatic tire shown in FIG. 3.
Figure 5:
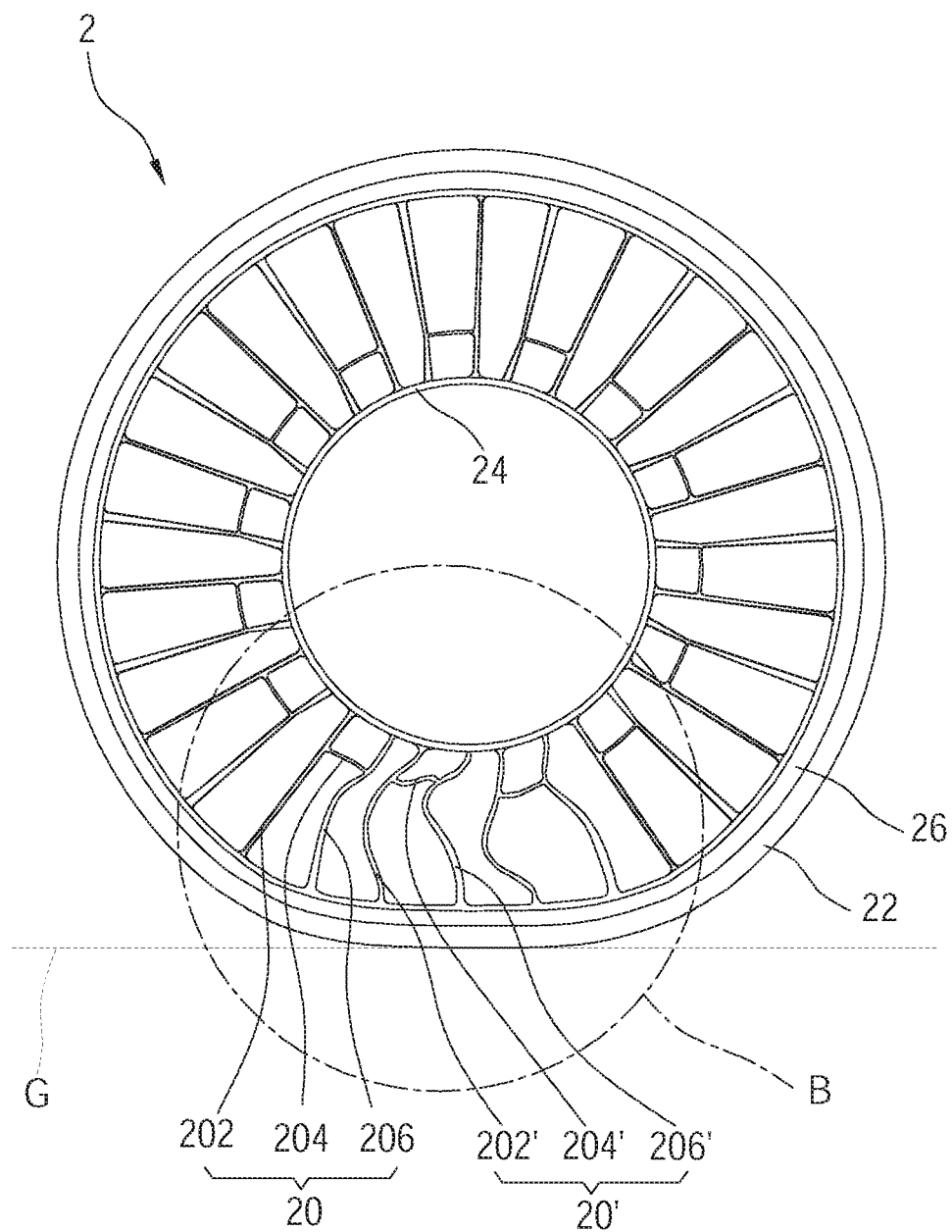
FIG. 5 is a side view of the non-pneumatic tire shown in FIG. 3 showing the bottom of the non-pneumatic tire is squeezed under the weight.
Figure 6:
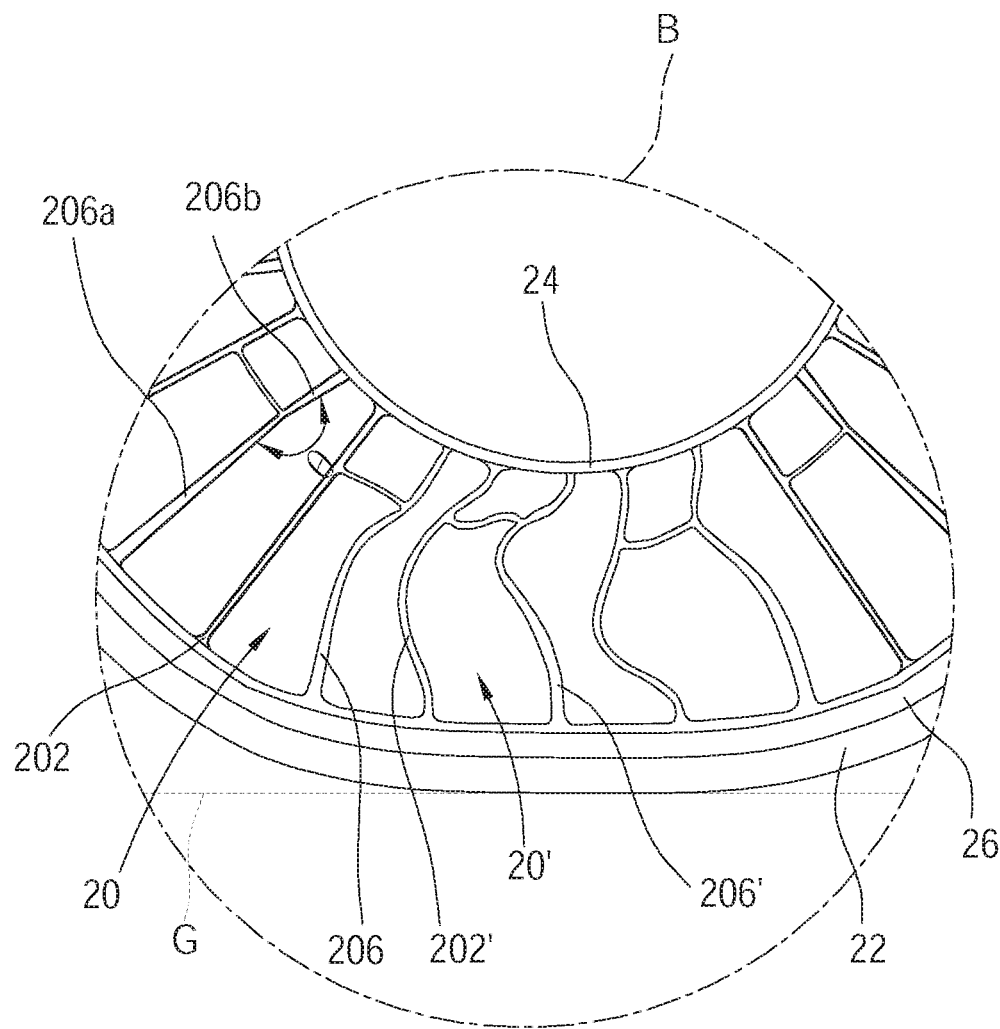
FIG. 6 is an enlarged partial view of a marked region B in FIG. 5.

A non-pneumatic tire 2 according to an embodiment of the present invention is illustrated in FIG. 3 to FIG. 6 and is adapted to be disposed on a drive shaft or a wheel rim of matching size depending on the requirements, wherein FIG. 3 is a perspective view of the non-pneumatic tire 2 according to the embodiment of the present invention; FIG. 4 is a side view of the non-pneumatic tire 2 shown in FIG. 3; FIG. 5 is another side view of the non-pneumatic tire 2 shown in FIG. 3 showing a bottom of the non-pneumatic tire 2 is squeezed under a weight; FIG. 6 is an enlarged partial view of a marked region B in FIG. 5.

The non-pneumatic tire 2 includes a tread layer 22 and a spoke layer, wherein the tread layer 22 is annular and is adapted to get in contact with a ground G. In the current embodiment, the tread layer 22 is an outermost layer of the non-pneumatic tire 2, so that the tread layer 22 has a maximum outer diameter of the non-pneumatic tire 2.

The spoke layer includes an inner cylinder 24 and a plurality of spoke assemblies 20, wherein the spoke assemblies 20 extend in a radial direction of the non-pneumatic tire 2 and are arranged around an axial core of the non-pneumatic tire 2. An end of each of the spoke assemblies 20 is connected to the inner cylinder 24, and another end of each of the spoke assemblies 20 is connected to the tread layer 22. In the current embodiment, the inner cylinder 24 could be mounted on a drive shaft (not shown) or a wheel rim (not shown) of matching size depending on the requirements.

In the current embodiment, each of the spoke assemblies 20 includes a straight spoke 202, a connecting rib 204, and a bending spoke 206. The bending spoke 206 of each of the spoke assemblies 20 includes a first segment 206a and a second segment 206b, wherein the first segment 206a and the second segment 206b are not connected in a straight line. In the current embodiment, an end of the straight spoke 202 is connected to the inner cylinder 24, and another end of the straight spoke 202 is connected to the tread layer 22; an end of the bending spoke 206 is connected to the inner cylinder 24, and another end of the bending spoke 206 is connected to the tread layer 22.

The connecting rib 204 of each of the spoke assemblies 20 has a first end and a second end opposite to the first end, wherein the first end is connected to the straight spoke 202, and the second end is connected to the bending spoke 206. In the current embodiment, the connecting ribs 204 are spaced apart from one another and are arranged around the axial core of the non-pneumatic tire 2. The second segment 206b of the bending spoke 206 is closer to the inner cylinder 24 than the first segment 206a, while the first segment 206a of the bending spoke 206 is closer to the tread layer 22 than the second segment 206b. When the non-pneumatic tire 2 is squeezed under a weight, the spoke assemblies 20 do not get in contact with one another, as shown in FIG. 5 and FIG. 6.

In the current embodiment, when the non-pneumatic tire 2 is squeezed under a weight, the spoke assemblies 20, which are squeezed, substantially bend in a same direction. In other words, when the non-pneumatic tire 2 bears a weight and is squeezed, the straight spokes 202, 202' and the bending spokes 206, 206' of the spoke assemblies 20, 20', which are squeezed, substantially bend in a same direction, as shown in FIG. 5 and FIG. 6.

In the current embodiment, an angle $\theta$, which is not equal to 180 degrees, is formed between the first segment 206a and the second segment 206b. When the angle $\theta$ is smaller, the bending spokes 206, 206' are easily squeezed and bent, so a deformation value of the bending spokes 206, 206' is larger. On the contrary, when the angle $\theta$ is larger, the bending spokes 206, 206' are relatively straight and hard to bend and deform, so that when the bending spokes 206, 206' are squeezed, the bending spokes 206, 206' may bend and deform in any direction to get in contact with and rub against the adjacent spoke assemblies. In light of this, in the current embodiment, the angle $\theta$ is, but not limited to, greater than 90 degrees and smaller than 180 degrees. Preferably, the angle is greater than 120 degrees and smaller than 170 degrees. Most preferably, the angle $\theta$ is greater than 150 degrees and smaller than 160 degrees. In this way, when the bending spokes 206, 206' and the straight spoke 202, 202' are squeezed, the bending spokes 206, 206' could bend in the same direction, preventing the spoke assemblies 20, 20' from getting in contact with and rub against the adjacent spoke assemblies 20, 20'. In the current embodiment, a length of the first segment 206a of the bending spoke 206 of each of the spoke assemblies 20 is greater than a length of the second segment 206b of the bending spoke 206 of each of the spoke assemblies 20.

In the current embodiment, the inner cylinder 24 is closer to a junction of the first segment 206a and the second segment 206b than the tread layer 22, and the second end of each of the connecting ribs 204 is connected to the junction of the first segment 206a and the second segment 206b of one of the bending spokes 206, so that the inner cylinder 24 is closer to the connecting rib 204 than the tread layer 22.

In the current embodiment, the spoke layer includes an outer cylinder 26 connected to the tread layer 22, so that the end of each of the straight spokes 202 is connected to the inner cylinder 24, and the another end of each of the straight spokes 202 is connected to the outer cylinder 26; the end of each of the bending spokes 206 is connected to the inner cylinder 24, and the another end of each of the bending spokes 206 is connected to the outer cylinder 26. In the current embodiment, a material of the outer cylinder 26 of the spoke layer is the same as a material of the tread layer 22, so that the outer cylinder 26 of the spoke layer and the tread layer 22 could be integrally formed as a monolithic unit. In practice, the tread layer 22 could be adhered to the outer cylinder 26 of the spoke layer.

With the aforementioned design, since the spoke assemblies of the spoke layer of the non-pneumatic tire according to the embodiment of the present invention includes the bending spoke, the spoke assemblies do not get in contact with one another when the non-pneumatic tire is squeezed under a weight, thereby preventing frequent and severe friction between the spoke assemblies which are squeezed and bent, enhancing a durability and a safety of the non-pneumatic tire of the present invention. In addition, the bending spoke of the spoke assemblies of the spoke layer could make the bending spokes bend in the same direction when the spoke layer is squeezed, thereby reducing a contact probability between the spoke assemblies, which are squeezed and bent, and the adjacent spoke assemblies, improving the durability and a rigidity of the non-pneumatic tire.

It must be pointed out that the embodiments described above are only some preferred embodiments of the present invention. All equivalent structures which employ the concepts disclosed in this specification and the appended claims should fall within the scope of the present invention.

What is claimed is:

1. A non-pneumatic tire, comprising:
   a tread layer which is annular and has a maximum outer diameter of the non-pneumatic tire and is adapted to be in contact with a ground;
   a spoke layer comprising an inner cylinder and a plurality of spoke assemblies, wherein the spoke assemblies extend in a radial direction of the non-pneumatic tire and are arranged around an axial core of the non-pneumatic tire; an end of each of the spoke assemblies is connected to the inner cylinder, and another end of each of the spoke assemblies is connected to the tread layer, wherein each of the spoke assemblies comprises:
   a straight spoke;
   a bending spoke comprising a first segment and a second segment, wherein the first segment and the second segment are not connected in a straight line; and
   a connecting rib having a first end and a second end opposite to the first end, wherein the first end is connected to the straight spoke, and the second end is connected to the bending spoke;
   wherein when the non-pneumatic tire bears a weight and is squeezed, the spoke assemblies do not get in contact with one another;
   wherein the first segment extends along a straight line, and the second segment extends along another straight line;
   wherein an angle, which is not equal to 180 degrees, is formed between the first segment and the second segment of the bending spoke of each of the spoke assemblies; the angle is greater than 90 degrees and is smaller than 180 degrees; and
   wherein the second end of the connecting rib of each of the spoke assemblies is correspondingly connected to a junction of the first segment and the second segment of the bending spoke.

2. The non-pneumatic tire as claimed in claim 1, wherein when the non-pneumatic tire is squeezed under a weight, the spoke assemblies, which are squeezed, substantially bend in a same direction.

3. The non-pneumatic tire as claimed in claim 2, wherein when the non-pneumatic tire is squeezed under a weight, the straight spoke and the bending spoke of the spoke assemblies, which are squeezed, substantially bend in a same direction.

4. The non-pneumatic tire as claimed in claim 1, wherein the connecting ribs of the spoke assemblies are spaced apart from one another and are arranged around the axial core of the non-pneumatic tire.

5. The non-pneumatic tire as claimed in claim 1, wherein the second segment of the bending spoke of each of the spoke assemblies is closer to the inner cylinder than the first segment, while the first segment of the bending spoke of each of the spoke assemblies is closer to the tread layer than the second segment.

6. The non-pneumatic tire as claimed in claim 1, wherein the inner cylinder is closer to a junction of the first segment and the second segment than the tread layer.

7. The non-pneumatic tire as claimed in claim 6, wherein the inner cylinder is closer to the connecting rib than the tread layer.

8. The non-pneumatic tire as claimed in claim 1, wherein the inner cylinder is closer to the connecting rib than the tread layer.

9. The non-pneumatic tire as claimed in claim 8, wherein a material of the outer cylinder of the spoke layer and a material of the tread layer are the same.

10. The non-pneumatic tire as claimed in claim 8, wherein the outer cylinder of the spoke layer and the tread layer are integrally formed as a monolithic unit.

11. The non-pneumatic tire as claimed in claim 8, wherein the tread layer is adhered to the outer cylinder of the spoke layer.

12. The non-pneumatic tire as claimed in claim 1, wherein the spoke layer comprises an outer cylinder connected to the tread layer.

* * * * *